United States Patent

Bartneck

Patent Number: 4,494,266
Date of Patent: * Jan. 22, 1985

[54] MOLDED SHOE

[76] Inventor: Hans Bartneck, 5291 Autumn Wood Dr., Cincinnati, Ohio 45242

[*] Notice: The portion of the term of this patent subsequent to Jun. 8, 1999 has been disclaimed.

[21] Appl. No.: 358,919

[22] Filed: Mar. 17, 1982

Related U.S. Application Data

[62] Division of Ser. No. 145,560, May 1, 1980, Pat. No. 4,333,193.

[51] Int. Cl.³ .............. A43D 9/00; A43C 13/08; A43B 9/10
[52] U.S. Cl. .................. 12/142 RS; 36/14; 36/16
[58] Field of Search .......... 12/142 RS, 142 T, 142 R, 12/1 W; 36/14, 16

[56] References Cited

U.S. PATENT DOCUMENTS

| 2,520,301 | 8/1950 | Ayers | 36/16 |
| 2,651,118 | 9/1953 | Root | 36/16 |
| 3,345,763 | 10/1967 | Rollman | 36/14 |
| 4,333,193 | 6/1982 | Bartneck | 36/14 |

FOREIGN PATENT DOCUMENTS

| 681969 | 10/1952 | United Kingdom . |
| 766011 | 1/1957 | United Kingdom . |
| 1138729 | 1/1969 | United Kingdom . |
| 1197571 | 7/1970 | United Kingdom . |
| 1206950 | 9/1970 | United Kingdom . |
| 1242216 | 8/1971 | United Kingdom . |
| 1246096 | 9/1971 | United Kingdom . |
| 1551037 | 8/1979 | United Kingdom . |

*Primary Examiner*—Werner H. Schroeder
*Assistant Examiner*—Steven N. Meyers
*Attorney, Agent, or Firm*—Gilbert L. Wells

[57] ABSTRACT

A shoe upper is directly joined to a shoe sole and contoured to a last by stitching a socklining to an upper and providing a mold engaging lip between the lower periphery of the upper and the stitched seam. The stitched sockling and upper are then mounted on a last. The lasted sockling and upper are mounted in a two piece, resilient upper mold and the upper mold is then mounted on a bottom mold having expanding, foaming resin therein with the mold engaging lip resiliently held between the edges of the upper and lower molds. An integrally joined shoe upper and sole are formed thereby.

1 Claim, 4 Drawing Figures

MOLDED SHOE

This is a division of application Ser. No. 145,560, filed May 1, 1980, now U.S. Pat. No. 4,333,193.

CROSS REFERENCES TO RELATED APPLICATIONS

Applicant has made application for a design application entitled "Shoe Unitsole" on June 27, 1978, having a Ser. No. 919,583 and now abandoned. This design application shows a unitsole which uses the prior art apparatus for molding which is modified according to the needs of the present invention. In addition, applicant has copending application Ser. No. 21,299, filed Mar. 16, 1979 and having the title "Slip-Lasted Upper and Contour Unitsole Shoe Construction" and now abandoned.

BACKGROUND OF THE INVENTION

The field of the invention is boot and shoe making and the present invention is concerned with the combination of a lasted upper with a unitsole during the molding of the unitsole.

The state of the art of integrally molding a shoe sole to an upper may be ascertained by reference to U.S. Pat. No. 4,034,431, the disclosure of which is incorporated herein. With particular reference to FIGS. 36, 37, 68, 70a, 70b, 72-74, 77 and 83 of U.S. Pat. No. 4,034,431, it can be seen that the upper is molded and connected to a shoe sole in an injection molding cavity by flowing molten resinous material which forms the sole around connecting portions of lateral side sections of the upper.

Shoe unitsoles, such as those shown in applications Ser. Nos. 919,583 and 21,299, are mass produced on a machine disclosed in a brochure entitled "Spare Parts list for Type F-Machine and Periphery Machinery PA20" published March 1976 and supplied by Elastogran Maschenenbau GmbH & Co., Polyurethan-Gruppe der BASF, Mitterstrasseweg, Stasslach vor Muenchen, West Germany. In this machine, unitsole molds are located in stations within an outer circle of about 20 feet in diameter. A metering arm is pivoted for rotation in the middle of the circle and delivers given amounts of a mixture of isocyanate and polyol to each molding station in succession. After delivery of the isocyanate-polyol mixture to a bottom mold, the metering arm is rotated to the next station, the open mold with expanding polyurethane resin is covered with a top mold and while the next mold is being filled, the exothermic reaction of the isocyanate-polyol cures and forms the unitsole within 5 minutes.

A suitable commercial isocyanate-polyol composition useful with the Type F-Machine and Periphery Machinery PA20 and with the present invention is a product of the Mobay Chemical Co. designated BAYFLEX 230. This commercial isocyanatepolyol composition uses approximately 38.5 parts per weight of MONDUR BF to approximately 100 parts per weight of BAYFLEX 230 poly(oxyalkylene) polyol to form the foamed polyurethane unitsoles. The polyurethane unitsoles are foamed to a specific gravity of 0.35-0.60 in approximately 3-3.5 minutes at a temperature of about 125°-135° F. and a pressure of about 10-40 lbs per square inch is generated by the exothermic reaction.

Other foamed resins besides polyurethane are useful in the present invention such as foaming epoxy, polyester and polyvinyl resins. The state of the art of foamed plastics may be ascertained by reference to the Kirk-Othmer, "Encyclopedia of Chemical Technology", Second Edition, Vol. 9 (1966), pp. 847-884 under the section Foamed Plastics and Vol. 21 (1970) pp. 56-106 under the section Urethane Polymers the disclosures of which are incorporated herein.

The prior art method of direct molding an upper to a shoe sole as disclosed by U.S. Pat. No. 4,034,431 requires the use of injection molding apparatus with the resulting expense of metal conforming molds for each shoe design and size.

SUMMARY OF THE INVENTION

Having in mind the limitations of the high cost of prior art methods of direct molding of a shoe upper to a sole portion, it is an object of the present invention to provide a simplified method and apparatus for direct molding of an upper to a shoe sole.

This object is accomplished according to the present invention in a modification of the prior art unitsole method and apparatus by attaching the shoe upper to the unitsole during the molding thereof. This modification is accomplished by in sequence:

(1) stitching a full sole socklining to an upper at a given distance from the lower peripheral edge of the upper so that a mold engaging lip of the upper is defined between the socklining seam and the lower peripheral edge;

(2) mounting the upper with stitched socklining on a shoe last to conform the full sole socklining and the upper to the last;

(3) supporting the lasted upper with stitched socklining in a resilient upper mold;

(4) filling an unitsole lower mold with an expandable resin foaming mixture; and (5) mounting the upper mold over the lower mold so that the mold engaging lip of the upper is secured resiliently between the edges of the upper and lower molds and curing the expanding resin to the underside of the socklining and mold engaging lip and containing the upper, socklining and sole to the last.

The complete shoe is then removed from the mold and taken off the last. Then the excess of the mold engaging lip is trimmed to the outer dimensions of the unit sole and the shoe is ready for wear.

BRIEF DESCRIPTION OF THE DRAWINGS

The invention is illustrated by a simplified embodiment in the attached drawings, wherein.

DESCRIPTION OF THE PREFERRED EMBODIMENTS

Figure 1:
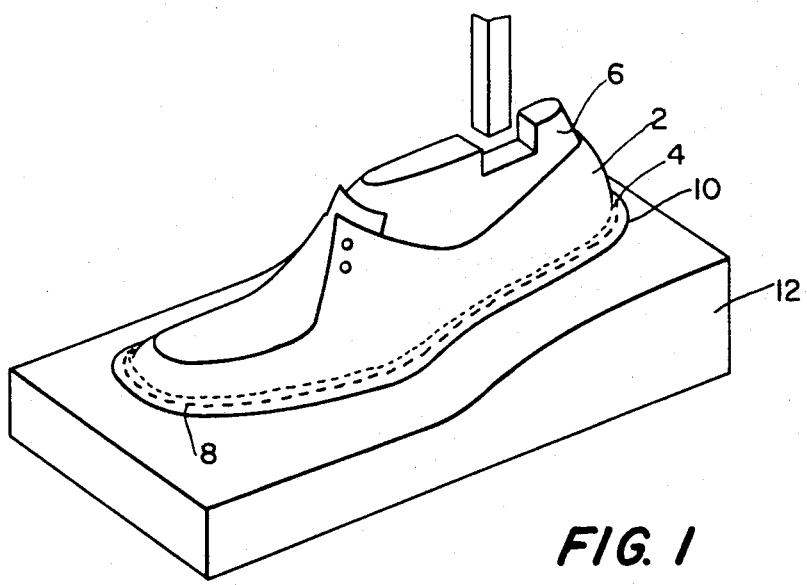
FIG. 1 is a perspective view of the lasted upper of the present invention with the mold engaging lip shown extending continuously over the upper peripheral edge of the bottom unitsole mold.

With particular reference to FIG. 1, an embodiment of the present invention is shown with an upper 2 having a socklining sewn thereto by a seam 4 mounted on a shoe last 6. A nonfunctional false stitch 8, for decorative purposes only, is also shown.

The mold engaging lip 10 is shown overlapping the upper peripheral edge of unitsole bottom mold 12 in FIG. 1.

Figure 2:
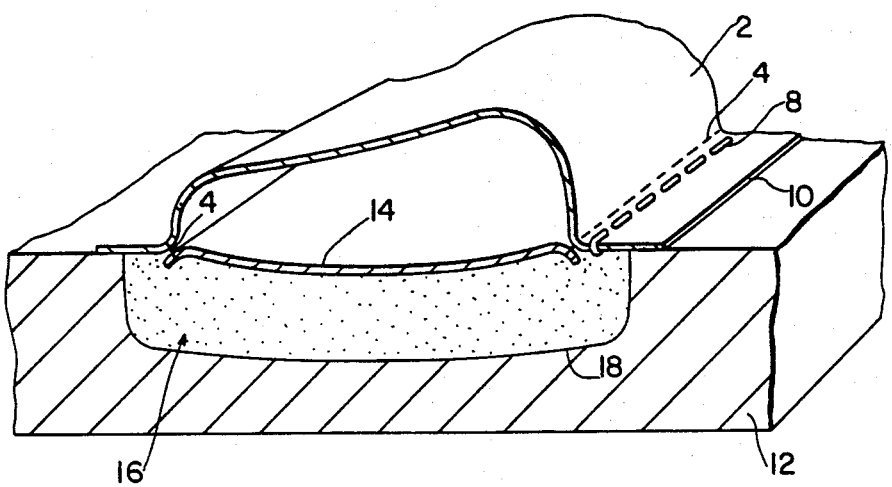
FIG. 2 is a detailed perspective view in partial cross section of the lasted upper of FIG. 1 showing the bottom unitsole cavity with the expanding foaming resin therein.

Socklining 14 is shown in FIG. 2 stitched to the upper 2 by seam 4. Expanding resin 16 is shown expanding in cavity 18.

Figure 3:
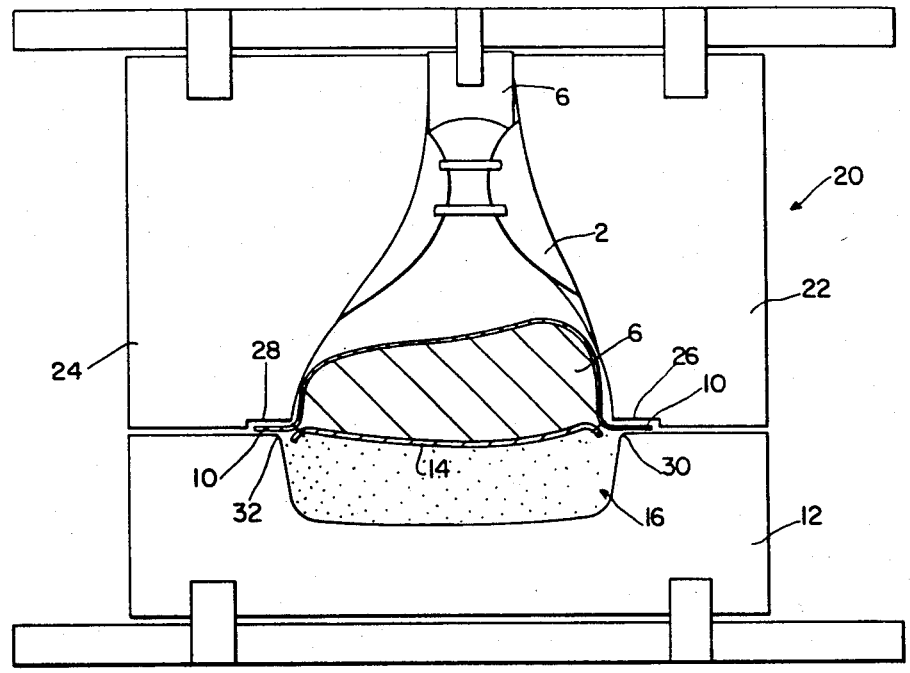
FIG. 3 is a cross-sectional view of the lasted upper and stitched socklining mounted in the molding apparatus of the present invention.

FIG. 3 shows the lasted upper 2 mounted over the expanding resin 16 in the cavity of the bottom mold 12 with the upper hard rubber mold 20 having split side portions 22 and 24. Mold engaging lip 10 is shown resiliently engaged between edges 26 and 28 of the upper mold and edges 30 and 32 of the lower mold.

Figure 4:
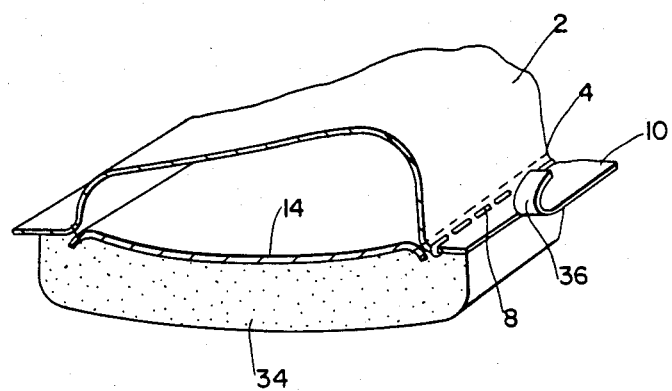
FIG. 4 is a detailed perspective view in partial cross section of the integrally molded upper and unitsole of the present invention with the excess mold engaging lip being trimmed therefrom.

FIG. 4 shows in detail and cross section a portion of the integrally molded upper 2, socklining 14, seam and sole 34 with excess 36 being removed from the mold engaging lip 10.

According to the best mode of carrying out the present invention, an upper 2 is prepared from a patterned cutting consisting of a material such as leather, synthetic leather, vinyl, polyurethane, porometric material, etc. A socklining is also prepared from a patterned cutting from a textile material and the two pieces are then stitched together along seam 4 where the seam follows the featherline of the last. The mold engaging lip 10 is provided between the outer lower peripheral edge of the upper 2 and the seam 4.

The stitched socklining and upper are then mounted on last 6 and the lasted upper is then mounted in upper mold 20 between halves 22 and 24 where the mold halves are made of a resilient material such as hard rubber or low porosity polyurethane. The upper mold at this time is pivoted away from the top of the lower mold 12 to a vertical position.

Sufficient isocyanate-polyol mixture of MONDUR BF-BAYFLEX 230 polyol in a weight ratio of 38.5 to 100 to form the sole is metered into the cavity 18 of the bottom mold and the upper mold is then returned to the horizontal position with resilient pressure applied to the periphery of the mold engaging lip between the edges 26, 28, 30 and 32 of the molds. A pressure is generated in and between the mold cavity and the socklining of about 10–40 lbs per square inch as a result of the exothermic reaction of the polyurethane and the mold set-up is sufficient to contain this pressure and form a shoe with an upper, socklining and sole which is contoured to the last.

The contour molded shoe is maintained in the mold for a period of about 3–3.5 minutes and a temperature of about 125°–135° F. is generated.

Upper mold 20 is then pivoted to the vertical position, the halves 22 and 24 are separated, the lasted shoe is removed from the upper mold and the molded shoe is removed from the last.

After removal from the last, the excess lip 36 is removed by cutting or abrading away. The shoe is now ready for wear.

Non-functional stitching 10 can be added to give to the shoe the appearance of the stitchdown construction of the prior art. Of course, the present invention eliminates the entire conventional and expensive manufacturing process of the prior art where the upper and midsole are joined by a lockstitch prior to outsole attaching and the outsole is then attached by cement bonding or cement bonding combined with further stitching.

I claim:

1. An integrally molded upper and shoe sole made by the following steps in sequence:
   (a) stitching a full sole socklining to a shoe upper at a given distance from the lower peripheral edge of the upper, said distance defining a mold engaging lip of said upper;
   (b) mounting said upper with stitched socklining on a shoe last to conform said full sole socklining and upper to said last;
   (c) supporting the lasted upper and socklining in an upper mold;
   (d) filling a lower mold with an expanding, foaming resin for forming a sole; and
   (e) mounting said upper mold over said lower mold with said mold engaging lip of said upper secured resiliently between the edges of said upper and lower molds for a time sufficient to cure said resin to the underside of said lasted full sole socklining and upper and contour said upper, said socklining and said sole to said last.

* * * * *